(12) United States Patent
Geiser

(10) Patent No.: US 12,188,593 B2
(45) Date of Patent: Jan. 7, 2025

(54) QUICK RELEASE HOSE COUPLER

(71) Applicant: Geiser, Inc., Phoenix, AZ (US)

(72) Inventor: Sean Geiser, Phoenix, AZ (US)

(73) Assignee: Geiser, Inc., Phoenix, AZ (US)

( * ) Notice: Subject to any disclaimer, the term of this patent is extended or adjusted under 35 U.S.C. 154(b) by 0 days.

(21) Appl. No.: 18/315,609

(22) Filed: May 11, 2023

(65) Prior Publication Data

US 2024/0377009 A1 Nov. 14, 2024

(51) Int. Cl.
*F16L 37/00* (2006.01)

(52) U.S. Cl.
CPC .................. *F16L 37/004* (2013.01)

(58) Field of Classification Search
CPC .................................................. F16L 37/004
See application file for complete search history.

(56) References Cited

U.S. PATENT DOCUMENTS

| | | | | |
|---|---|---|---|---|
| 3,181,895 | A * | 5/1965 | Cator | F16L 37/004 285/1 |
| 4,708,699 | A * | 11/1987 | Takano | F16H 57/0006 474/93 |
| 11,339,904 | B2 * | 5/2022 | Ghodrati | F16L 37/004 |
| 11,466,804 | B1 * | 10/2022 | Miller | F01N 13/1827 |
| 2009/0293238 | A1 * | 12/2009 | Davis | H01F 7/0242 24/303 |
| 2012/0055728 | A1 * | 3/2012 | Bessho | B60K 17/344 180/292 |
| 2013/0033070 | A1 * | 2/2013 | Kinsman | B60J 5/0487 296/190.03 |
| 2013/0285365 | A1 * | 10/2013 | Davis | B65D 43/0202 285/9.1 |
| 2014/0262584 | A1 * | 9/2014 | Lovold | B60K 5/12 180/246 |
| 2015/0308561 | A1 * | 10/2015 | Itoo | F16H 57/027 474/146 |
| 2020/0352270 | A1 * | 11/2020 | Stahl | A42B 3/048 |

* cited by examiner

*Primary Examiner* — Zachary T Dragicevich
*Assistant Examiner* — James A Linford
(74) *Attorney, Agent, or Firm* — Schmeiser, Olsen & Watts LLP

(57) ABSTRACT

A quick release hose coupler for use with a clutch housing is provided. The quick release hose coupler includes a first member coupled to a clutch cover and a second member coupled to the hose. The first member and the second member may each have magnets coupled to them such that the magnets of the first member and the magnets of the second member may be coupled together or uncoupled to move the quick release hose coupler between a coupled position and an uncoupled position. In the coupled position the hose is coupled to the cover to provide the functionality intended as part of the venting/cooling of the clutch, and the in e uncoupled position, the hose separated from the cover, to allow the cover to be removed for repair/maintenance to the clutch.

3 Claims, 6 Drawing Sheets

QUICK RELEASE HOSE COUPLER

BACKGROUND OF THE INVENTION

Technical Field

This invention relates generally to hose couplers for a clutch housing/cover, and more particularly to a quick release hose coupler for use with a clutch cover on a UTV.

State of the Art

The use of utility task vehicles (UTV) often referred to as side-by-sides is increasing. As the use of UTVs increases, the maintenance of these vehicles is also increasing. UTVs are often operated on trails or raced along trails where access to repair shops and the like are impractical sources of repairs that often are needed during normal operation of the UTV. One such repair is replacement of the belt that operates the clutch of the UTV. In order to replace the belt, a clutch cover needs to be removed from the clutch housing to access the belt, remove the broken or damaged belt and install a new belt. Removing the housing can be time consuming and difficult if the proper tools are not readily available. In removing the housing, a hose needs to be removed from the clutch cover and this typically includes removing a hose clamp, which are not quick and at times cumbersome to remove depending on the type of UTV. There are no systems that exist for a quick release hose coupler that allows for the quick disconnect of the hose from the clutch cover in order to remove the clutch cover for servicing the clutch.

Accordingly, there is a need for a quick release hose coupler for use with a clutch cover.

SUMMARY OF THE INVENTION

An embodiment includes a quick release hose coupler for use with a clutch housing, the hose coupler comprising: a first member removably coupled to a clutch cover vent orifice, wherein the first member comprises at least one magnet coupled to at one magnet protrusion of the first member; and a second member removably coupled to a hose, the second member having a size and shape to correspond to the size and shape of the first member, wherein the second member comprises at least one magnet coupled to at least one magnet protrusion of the second member, wherein the first member and the second member are moveable between a coupled position and an uncoupled position, wherein in the coupled position, the at least one magnet of the first member is releasably coupled to the at least one magnet of the second member, and in the uncoupled position, the at least one magnet of the first member is separated from the at least one magnet of the second member.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1A:
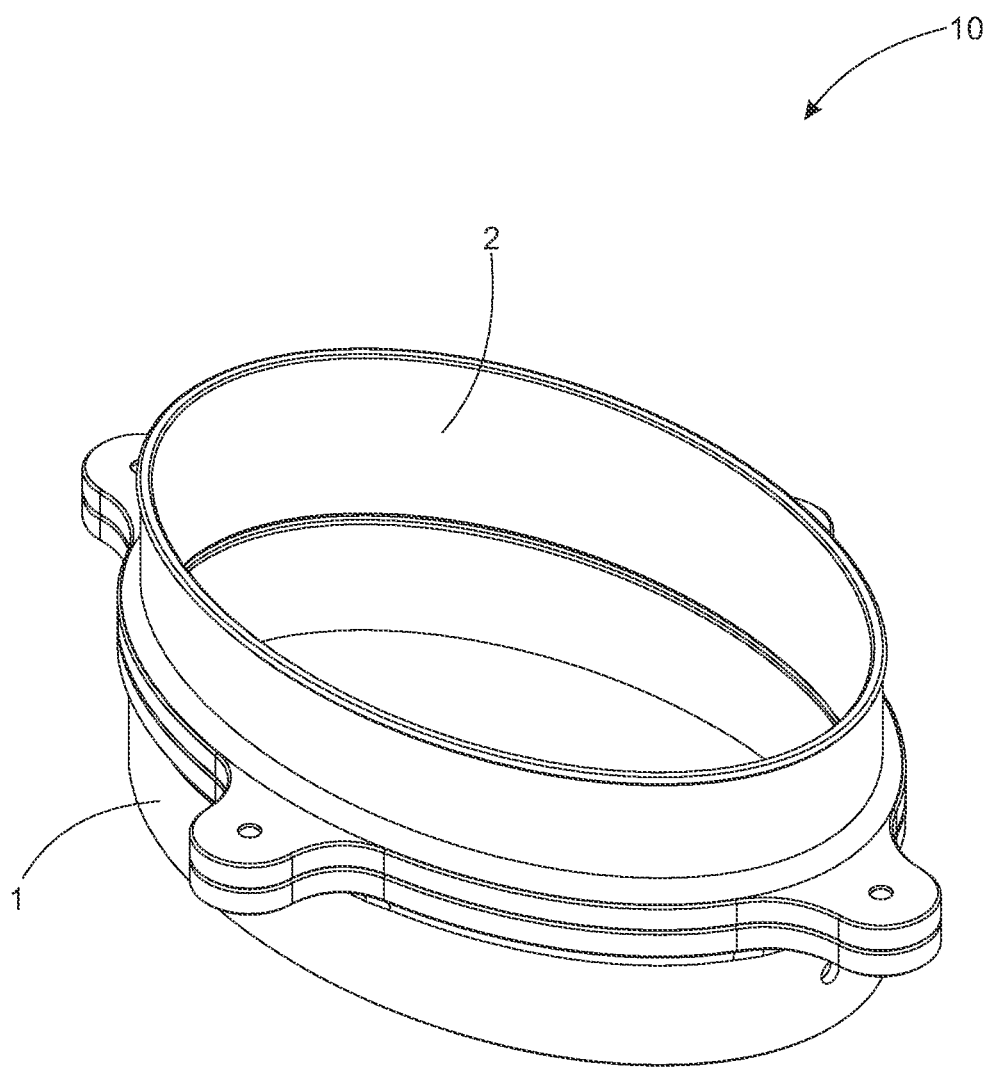
FIG. 1A is a perspective view of a quick release hose coupler for a clutch housing according to an embodiment.

As discussed above, embodiments of the present invention relate to a quick release hose coupler for use with a clutch cover/clutch housing.

Referring to the drawings, FIGS. 1A-4 depict a quick release hose coupler 10 according to an embodiment. The hose coupler 10 may include a first member 1 and a second member 2. The first member 1 and the second member 2 may be releasably coupled together and moveable between a coupled position and an uncoupled position.

The first member 1 may be a cylindrical body 11, that may be circular in cross-section, oval in cross-section or any other cross-sectional shape to correspond to the vent orifice of the clutch cover 30. The first member 1 may include an aperture 13 that extends through the cylindrical body 11. Further, the first member 1 may also include at least one protrusion 15 extending from an outer surface of the cylindrical body 11 at a first end 17 of the cylindrical body 11. A magnet 3 may be coupled to the at least one protrusion 15. The magnet 3 may be a strong magnet, such as an earth magnet or the like. The cylindrical body 11 may include a second end 19 that is coupled to the clutch cover 30.

As shown in the drawing figures, the cylindrical body 11 of the first member 1 may include a plurality of protrusions 15 and a magnet 3 coupled to each protrusion. For example, each protrusion 15 may include a recess that receives and retains one magnet 3. The protrusions 15 may be located about a perimeter of the cylindrical body 11 with the magnets 3 facing away from the cylindrical body 11. The number of protrusion 15 and magnets 3 may be determined based on the particular specifications of the hose 32 to couple to the clutch cover 30.

The second member 2 may be a cylindrical body 12, that may be circular in cross-section, oval in cross-section or any other cross-sectional shape to correspond to the cross-sectional shape of the first member 1. The second member 2 may include an aperture 14 that extends through the cylindrical body 12. Further, the second member 2 may also include at least one protrusion 16 extending from an outer surface of the cylindrical body 12 at a first end 18 of the cylindrical body 12. A magnet 3 may be coupled to the at least one protrusion 16. The magnet 3 may be a strong magnet, such as an earth magnet or the like. The cylindrical body 12 may include a second end 20 that is coupled to a hose 32.

As shown in the drawing figures, the cylindrical body 12 of the second member 2 may include a plurality of protrusions 16 and a magnet 3 coupled to each protrusion. For example, each protrusion 16 may include a recess that receives and retains one magnet 3. The protrusions 16 may be located about a perimeter of the cylindrical body 12 with the magnets 3 facing away from the cylindrical body 12. The number of protrusion 15 and magnets 3 may be determined based on the particular specifications of the hose 32 to couple to the clutch cover 30. The number of protrusions 16 off the second member 2 correspond with the number of protrusions 15 of the first member 1.

Figure 1B:
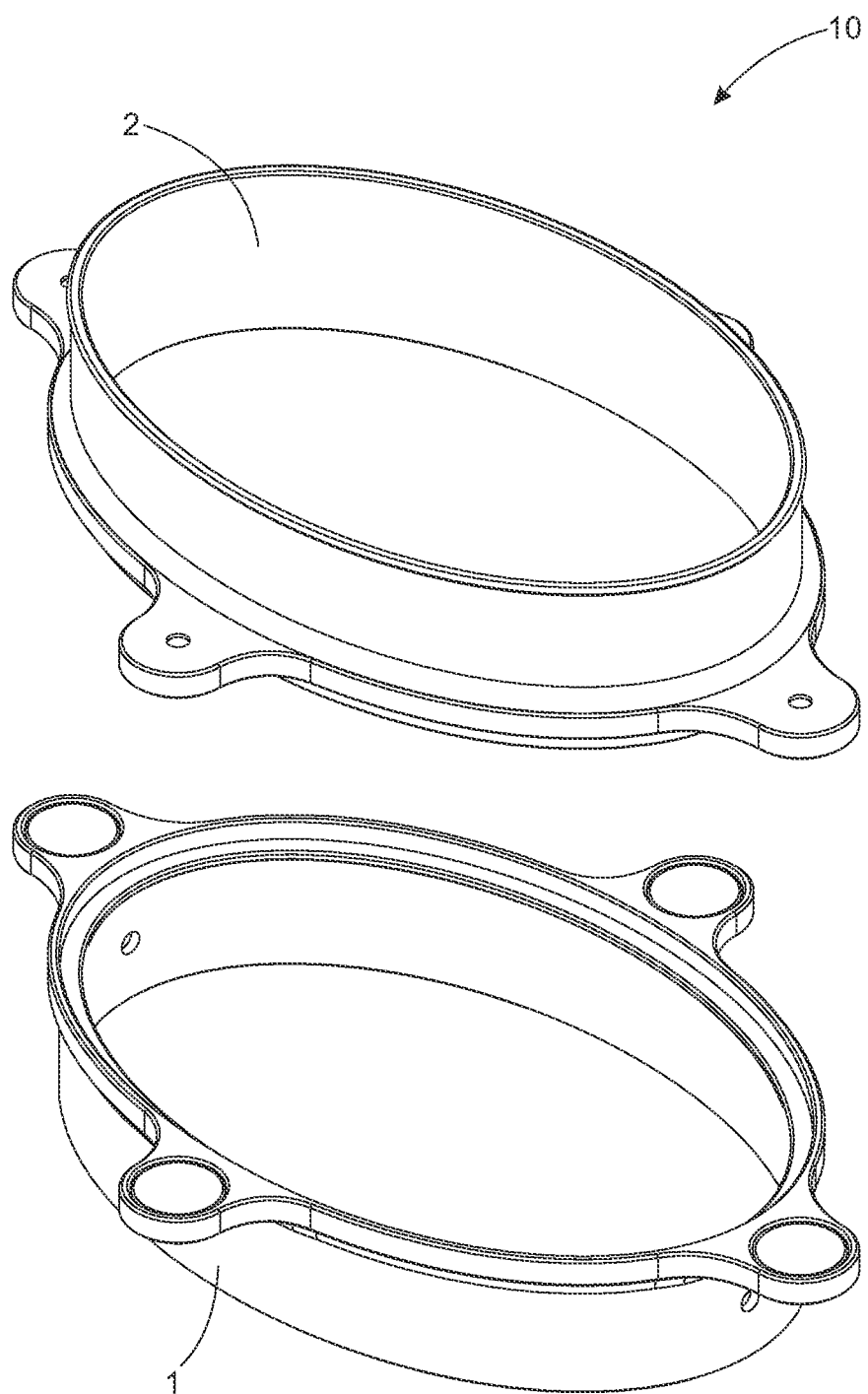
FIG. 1B is an exploded perspective view of a quick release hose coupler for a clutch housing according to an embodiment.
Figure 1C:
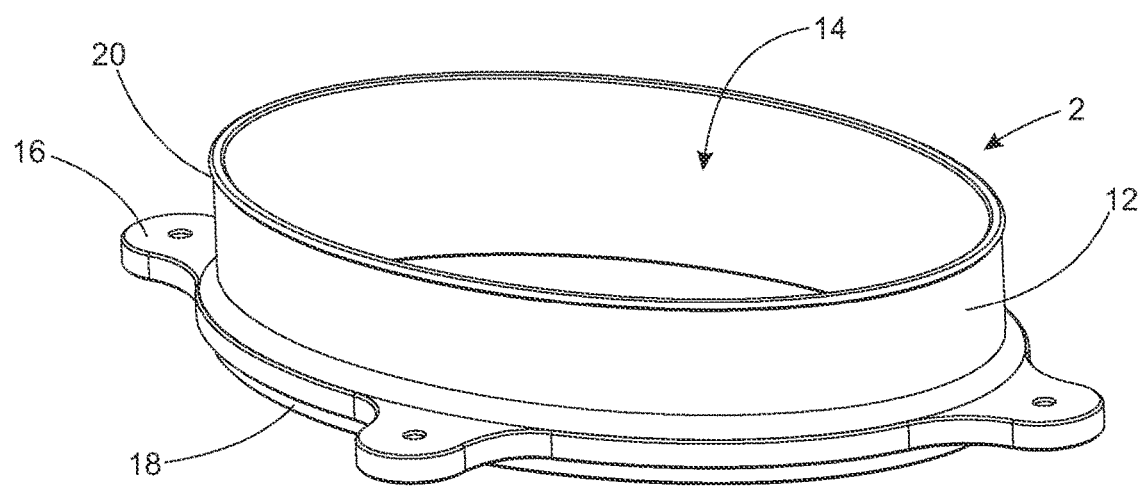
FIG. 1C is another exploded perspective view of a quick release hose coupler for a clutch housing according to an embodiment.
Figure 1C:
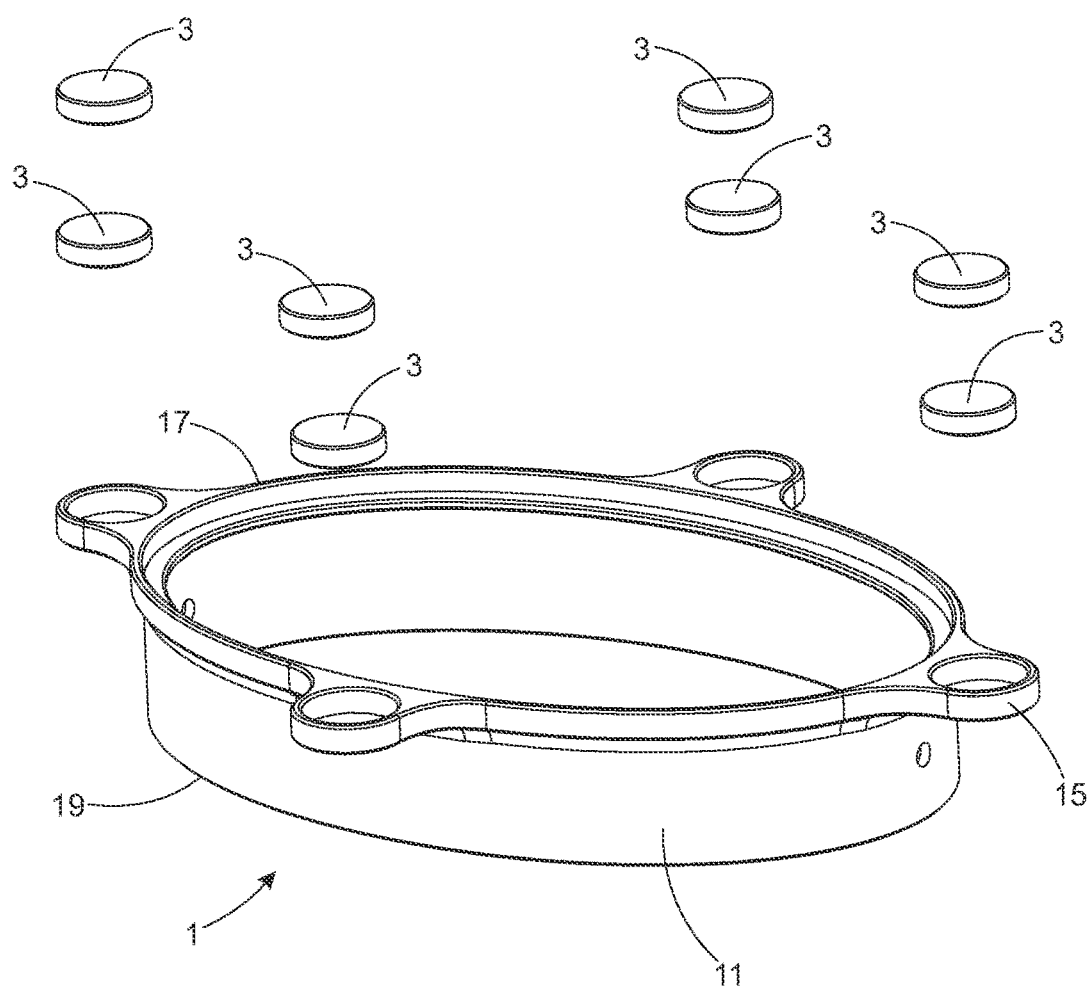

In embodiments, as shown in FIGS. 1A-1C, the first end 1 of the first member 1 may be a female receptacle with a recessed shelf or step formed in the first end 17 of the of the cylindrical body 11. This is sized and shaped to receive the male end extension of the first end 18 of the cylindrical body 12 of the second member 2. The insertion of the male extension of the second member 2 into the female receptacle of the first member 1 operates to align the apertures and allow the magnets to be placed adjacent each other for magnetic coupling of the magnets of the first member 1 with the magnets of the second member 2.

Figure 2:
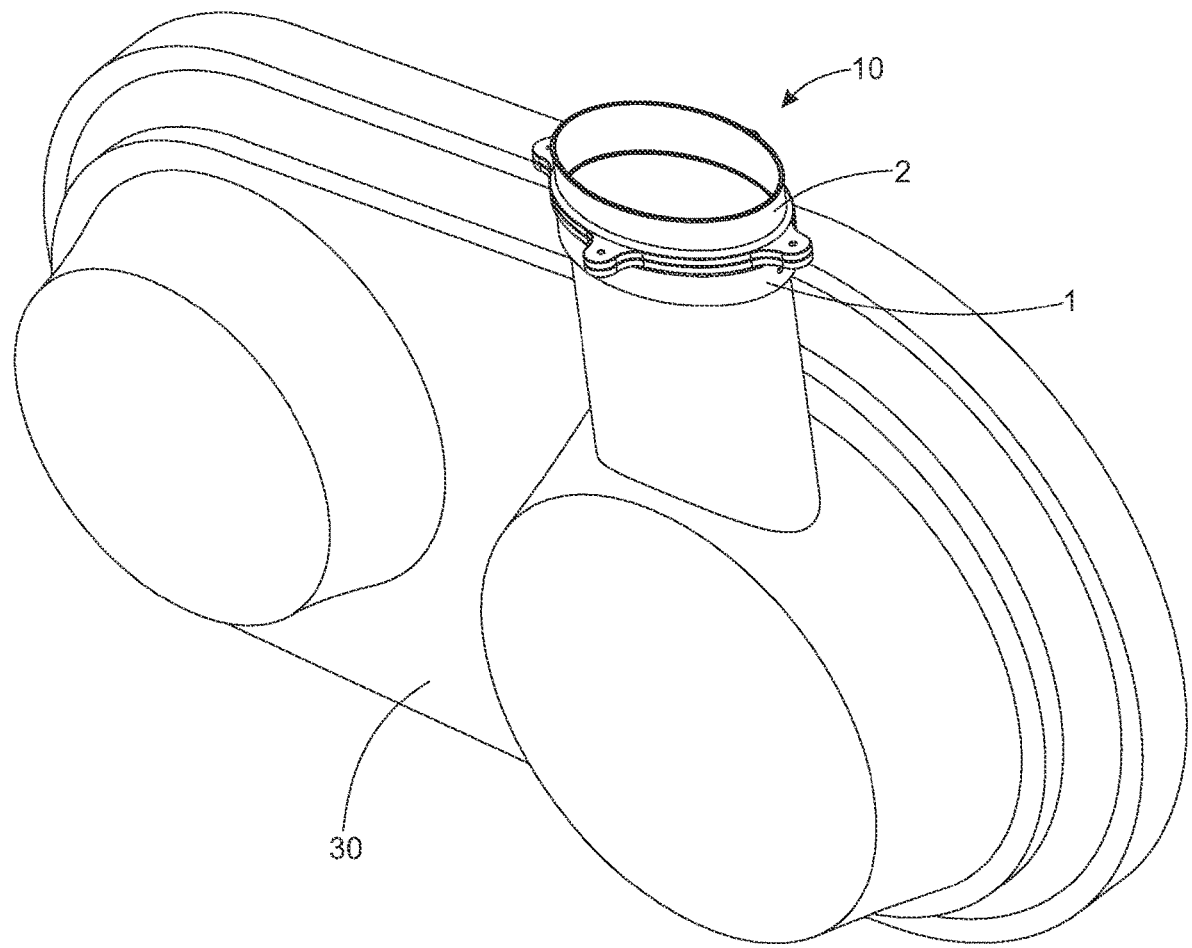
FIG. 2 is a perspective view of a quick release hose coupler installed on a clutch cover according to an embodiment.
Figure 3:
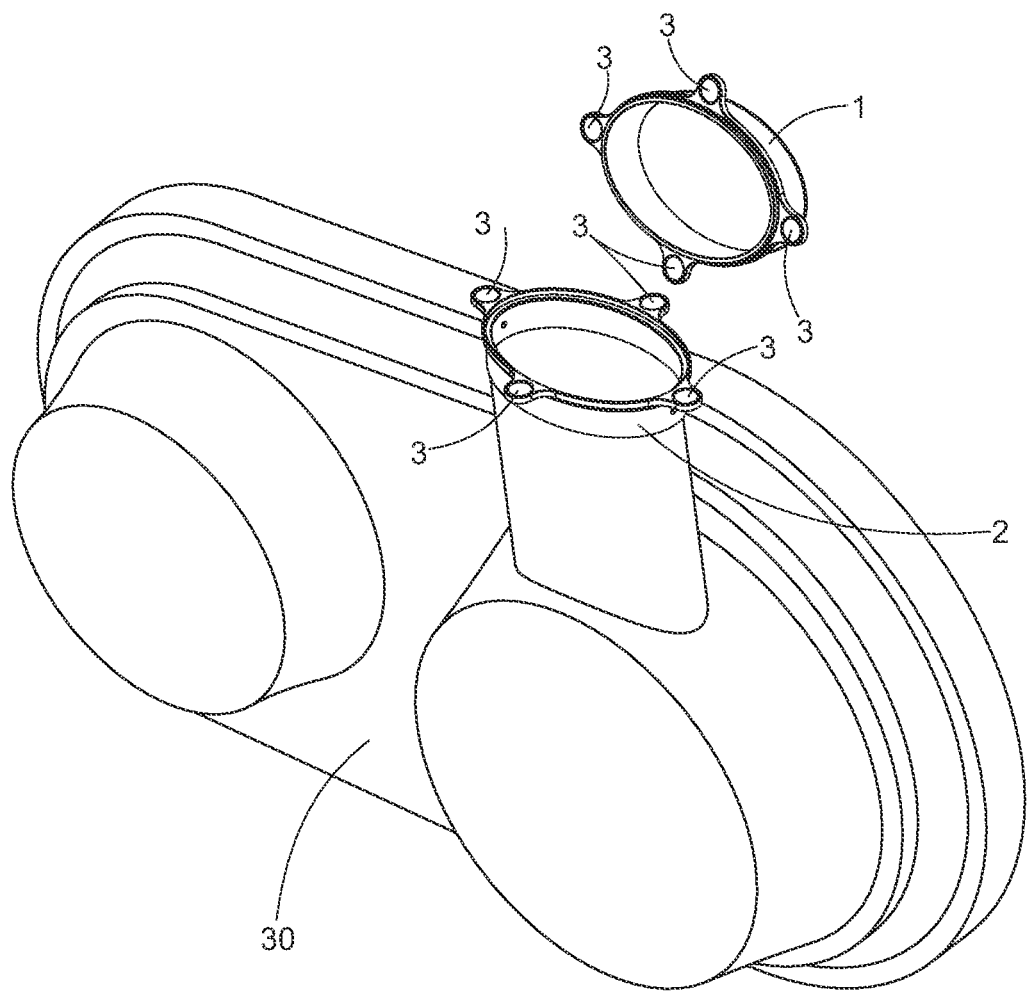
FIG. 3 is a perspective view of a quick release hose coupler installed on a clutch cover with the quick release coupler in an uncoupling condition according to an embodiment.
Figure 4:
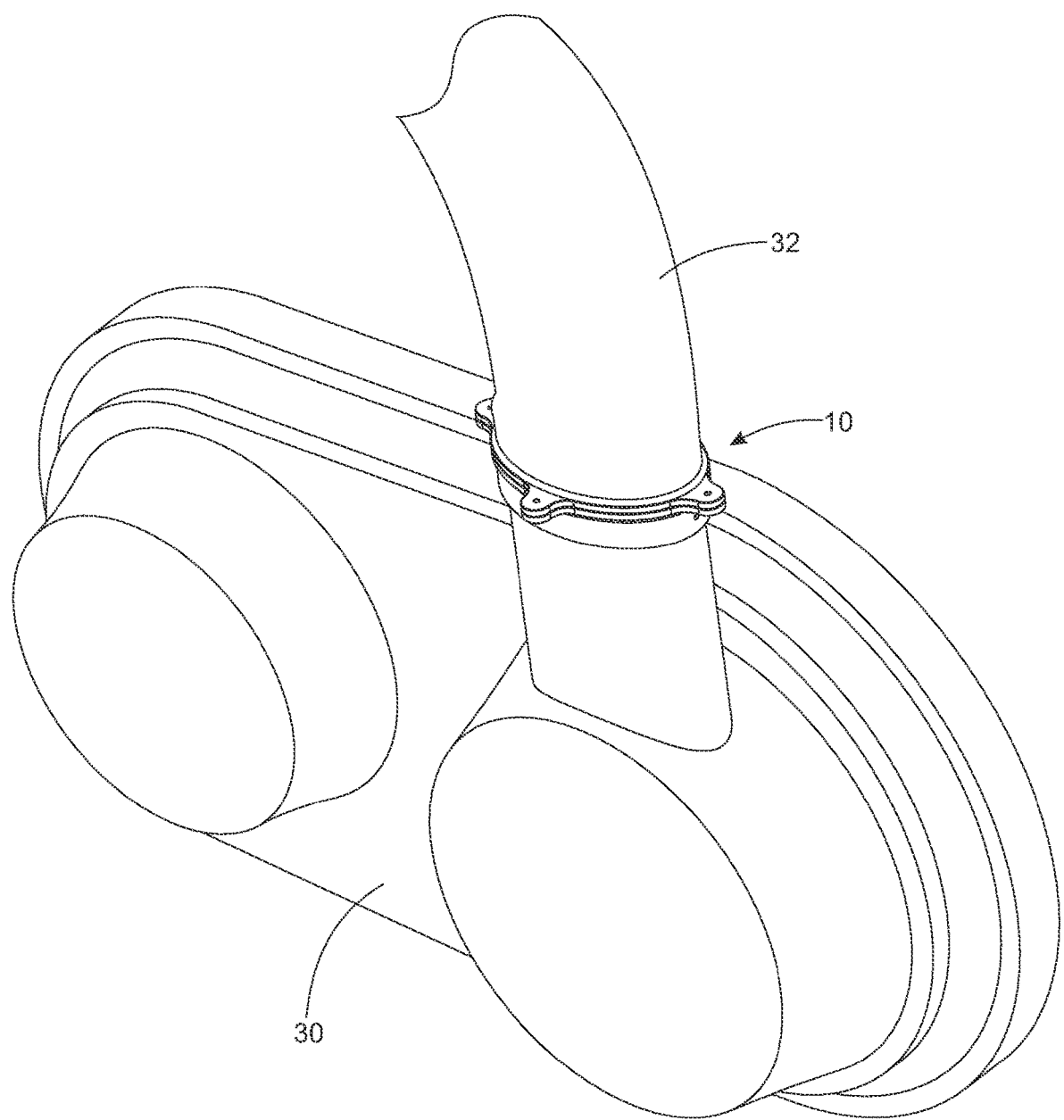
FIG. 4 is a perspective view of a quick release hose coupler installed on a clutch cover according to an embodiment.

As shown in FIGS. 1A-4, the quick release coupler 10 may be moved between a coupled position and an uncoupled position. In the coupled position, the at least one magnet 3 of the first member 1 is releasably coupled to the at least one magnet 3 of the second member 2, thereby holding the first member 1 in connection with the second member 2. In the coupled position, the aperture 13 of the first member and the aperture 14 of the second member are aligned with the axes of the first member 1 and second member 2 being aligned. The coupled position operates to align the hose 32 with the vent orifice of the clutch cover 20 in order to support proper cooling of the clutch during operation to increase belt life of the CVT clutch. FIGS. 1A, 2 and 4 depict the quick release hose coupler 10 in a coupled position.

In the uncoupled position, the at least one magnet 3 of the first member 1 is separated from the at least one magnet 3 of the second member 2. This may be accomplished by utilizing an external force to separate the second member 2 from the first member 1, and thereby separate the hose 32 from the clutch cover 30, thereby allowing removal of the clutch cover 30 allowing for repair and/or maintenance of the clutch. FIGS. 1B and 3 depict the quick release hose coupler 10 in in the uncoupled position.

For further clarity, FIG. 4 depicts a clutch cover 30 coupled to a clutch cover 30. The clutch cover 30 is coupled to a hose 32 by use of a conventional hose clamp that requires a screwdriver to loosen the clamp and allow for separation of the hose 32 from the clutch cover 30. This conventional clamp is being replaced in this invention by the quick release hose coupler 10 held adjacent the conventional device for coupling the hose.

While it is shown and described that the first member 1 is coupled to the clutch cover 30 and the second member 2 is coupled to the hose 32, it will be understood that in embodiments, the first member 1 may be coupled to the hose 32 and the second member 2 may be coupled to the clutch cover 30.

While the quick release hose coupler 10 is generally useful for all drivers, it becomes even more important for drivers that are also racing in events. This allows for in race repairs to be performed quickly and without hassle when time is of the essence.

Embodiments of the quick release hose coupler 10 may be formed of plastic, with exception of the magnets. Further, with exception of the magnets, the components defining any quick release hose coupler may be formed of any of many different types of materials or combinations thereof that can readily be formed into shaped objects provided that the components selected are consistent with the intended operation of a quick release hose coupler. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any quick release hose coupler may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A quick release hose coupler for use with a clutch housing, the hose coupler comprising:
   a first member removably coupled to a clutch cover vent orifice, the first member having a being an oval cylindrical body having an oval cylindrical inner wall surface therein, wherein the first member comprises at least one magnet coupled in a recess of at least one radially outward magnet protrusion of the first member; and
   a second member removably coupled to a hose, the second member being an oval cylindrical body having a size and shape to correspond to the size and shape of the first member, wherein the second member comprises at least one magnet coupled in a recess of at least one radially outward magnet protrusion of the second member, wherein the first member and the second member are moveable between a coupled position and an uncoupled position, wherein in the coupled position, the at least one magnet of the first member is releasably coupled to the at least one magnet of the second member, and in the uncoupled position, the at least one magnet of the first member is separated from the at least one magnet of the second member, wherein the first member comprises a female receptacle having a recessed shelf provided on the oval cylindrical inner wall surface, wherein the second member comprises a male extension provided on a first end of the second member, and wherein the male extension is sized and shaped to be directly received by the recessed shelf, the magnet protrusion of both the first and second members extend transversely from a respective oval outer wall, where the magnet protrusion of the first member forms a portion of the recessed shelf and the oval shaped of the first and second members aid in aligning the respective magnets.

2. The quick release hose coupler of claim 1, wherein the recessed shelf is formed in a first end of the first member, and wherein the recessed shelf extends inwardly relative to the female receptacle.

3. The quick release hose coupler of claim 1, wherein insertion of the male extension of the second member into the female receptacle of the first member aligns apertures of the first member and the second member and aligns and allows the magnets of the first member and the second member to be placed adjacent each other for magnetic coupling.

\* \* \* \* \*